(No Model.)
E. SALTZKORN & L. NICOLAI.
MACHINE FOR SPREADING PASTE, &c., ON STRIPS OF PAPER.
No. 537,310.  Patented Apr. 9, 1895.
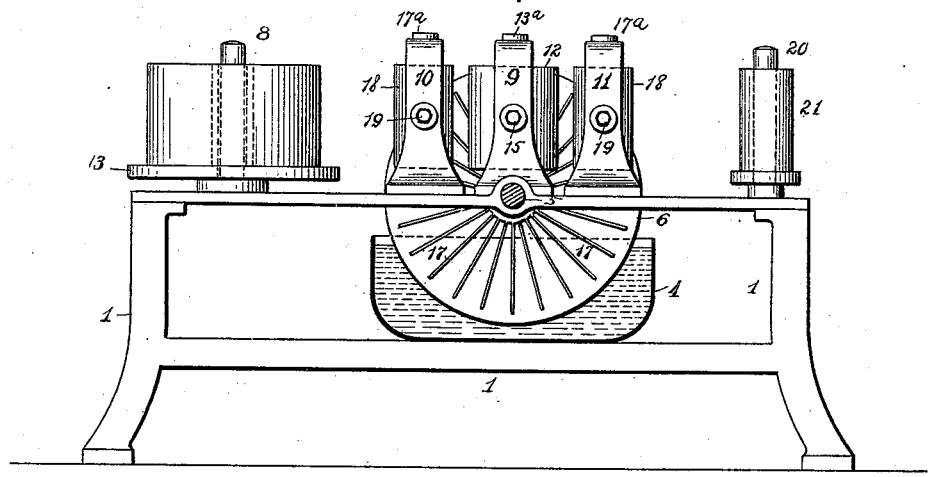
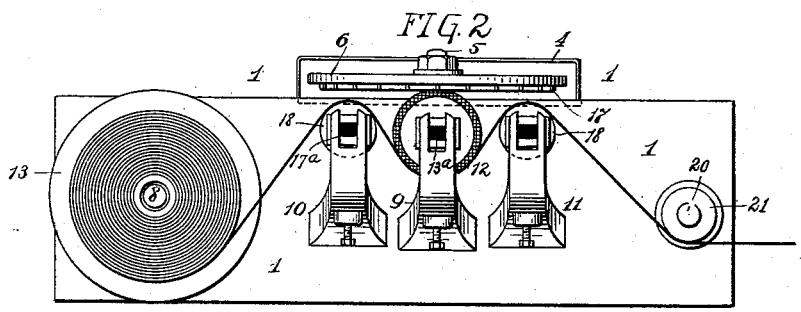
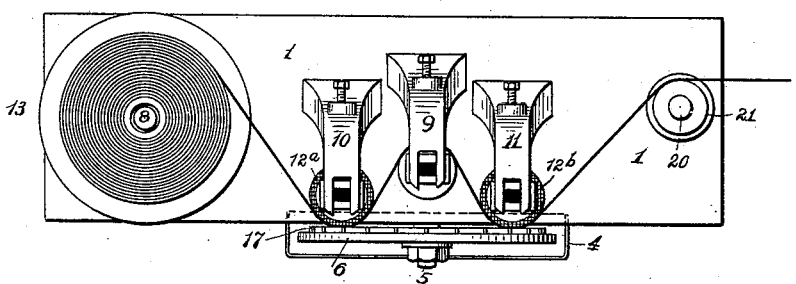
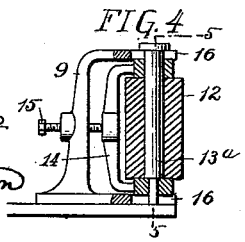

UNITED STATES PATENT OFFICE.

EMIL SALTZKORN AND LUDWIG NICOLAI, OF DRESDEN, GERMANY.

MACHINE FOR SPREADING PASTE, &c., ON STRIPS OF PAPER.

SPECIFICATION forming part of Letters Patent No. 537,310, dated April 9, 1895.

Application filed February 2, 1893. Serial No. 460,804. (No model.) Patented in Germany July 20, 1892, No. 66,966; in France July 29, 1892, No. 223,326; in Belgium July 29, 1892, No. 100,735, and in England August 9, 1892, No. 14,381.

*To all whom it may concern:*

Be it known that we, EMIL SALTZKORN and LUDWIG NICOLAI, subjects of the King of Saxony, residing at Dresden, Saxony, in the Empire of Germany, have invented certain new and useful Improvements in Machines for Spreading Paste or Similar Substances on Strips or Bands of Paper, &c., (for which we have obtained Letters Patent as follows: in Great Britain, No. 14,381, dated August 9, 1892; in Belgium, No. 100,735, dated July 29, 1892; in Germany, No. 66,966, dated July 20, 1892, and in France, No. 223,326, dated July 29, 1892,) of which the following is a specification.

The object of our invention is to provide an effective apparatus for supplying paste, or coloring matter, to strips or bands of paper, &c., one of the principal objects of the invention being to utilize the pulling strain produced by the feed of the strip or band for the purpose of operating the paste-distributing devices, so that all auxiliary operating mechanism may be dispensed with. This object we attain in the manner more fully set forth hereinafter, reference being had to the accompanying drawings, in which—

Figure 1 is a sectional elevation on the line 1—1 of Fig. 2 of a machine constructed in accordance with our invention. Fig. 2 is a plan view of the same. Fig. 3 is a plan view illustrating a modified construction. Fig. 4 is a sectional view of a detail on the line 4—4 Fig. 5. Fig. 5 is a sectional elevation on the line 5—5 Fig. 4.

Referring to the drawings 1 represents a suitable supporting framework, or table, on which is mounted a spindle or support, 8, for the reception of a drum, 13, on which the strip or band to be supplied with paste or color is wound.

Extending transversely across the table or secured thereto in any suitable manner is a stub shaft, 5, on which is mounted a disk, 6, provided on one of its faces with a series of radially arranged ribs, 17, the disk being of such size and so mounted as to extend below the surface of the table and travel partly within a reservoir, 4, arranged immediately below the disk and adapted to contain a supply of paste or coloring matter or other substance.

On the upper surface of the table are secured three bracket arms, 9, 10, and 11 the central bracket, 9, being adapted to support a supply roller, 12, mounted on a spindle, 13ª, the opposite ends of which are secured in the opposite arms of a yoke, 14, which may be adjusted toward and from the supply disk by a screw, 15, and in order to permit of this adjustment the upper and lower portions of the bracket arm are slotted at 16, 16, for the reception of blocks projecting from the yoke, 14, or as shown in the drawings, the spindle upon which the roller is mounted may extend through the bracket, the bearing arms of the yoke, and the intervening roller so that when occasion requires the spindle may be readily removed and the roller examined or repaired. The peripheral surface of this roller, 12, is provided with a facing of yielding or absorbent material, and, if necessary, may be provided with a series of longitudinal ribs or grooves to engage with and turn the disk, 6, and the roller may, by adjusting the screw, 15, be forced into more or less intimate contact with the disk, so as to effectively rotate the latter.

The brackets 10 and 11 are similar in construction to bracket, 9, each being provided with a suitable spindle, 17ª, on which is mounted a guiding roller, 18, adjustable laterally by means of screws, 19, so that the relative positions of these rollers may be adjusted to cause a strip or band fed from the supply drum to be brought into contact with a greater or less portion of the periphery of the roller, 12.

At the opposite end of the table is a spindle, 20, on which is mounted a guide roller, 21, and the strip or band after feeding from the drum passes first over the guide roller, 18, thence partially around the supply roller and from thence over the guide rollers, 18, and 21, to the point where it is to be used. By this means the paste within the reservoir is at all times kept in an agitated condition, the heavier portions being prevented from settling to the bottom and, as the disk, 6, rotates, the radially arranged ribs become coated with paste, but before reaching the roller, 12, any access of paste will fall from the ribs by gravity into the reservoir, and the absorbent surface of the roller will receive an even and regular supply of paste which will be distributed upon the surface of the strip or band.

In Fig. 3 I have illustrated a slightly modified construction of the machine, the paste being distributed upon the paper from the ribs of the supply disk, and, by preference, two rollers, 12ª and 12ᵇ, having peripheral coverings of yielding material are utilized to guide the strip or band into position where it may be acted upon by the ribs, the pulling strain in this case also serving as the means for rotating the supply disk.

It will be understood that the apparatus herein described may be used for supplying coloring or other matter to the strips in place of the paste or adhesive material as herein described and that the parts of the apparatus may, if necessary, be duplicated so as to supply both of the sides of the strip with coloring matter or with paste or other material.

Having thus described our invention, what we claim, and desire to secure by Letters Patent, is—

1. The combination of the reservoir, a supply disk adapted to partially rotate therein, a series of radially arranged ribs on said disk, a supply roller in contact with such ribbed disk, and mechanism for guiding a strip or band into contact with the periphery of such supply rolls, substantially as specified.

2. The combination of the reservoir, a ribbed supply disk mounted on a horizontal axis and adapted to partially rotate in said reservoir, a supply roller mounted on a vertical axis and having a yielding face in contact with such ribbed disk, and mechanism for guiding a strip or band into contact with the periphery of such supply roller, substantially as specified.

3. The combination of the reservoir, a supply disk, 6, adapted to partially rotate therein, a series of radially arranged ribs on said supply disk, a supply roller in contact with the ribbed disk, and strip guiding roller adapted to guide a strip or band into contact with the periphery of such supply roller, substantially as specified.

4. The combination of the ribbed disk, a reservoir within which said disk partially rotates, a supply roller having a yielding face in contact with said disk, a vertical axis on which said supply roller is mounted, bearings therefor, devices for adjusting said bearings to regulate the contact between the supply roller and the face of the disk, and adjustable strip guiding rollers arranged substantially as and in the manner, set forth.

5. The combination of the reservoir, a ribbed disk, 6, adapted to partially rotate therein, supply roller, 12, having a yielding face in contact with such ribbed disk, a spindle 13ª on which said roller is mounted, a yoke 14, having bearings for such spindle, and a supporting bracket, 9, in which said yoke is adjustably secured, substantially as specified.

6. The combination of the supporting frame, a ribbed supply disk, paste supply and guiding rollers adapted to co-act therewith, a spindle, 8, carried by the frame and a strip-carrying drum, 13, mounted on said spindle, substantially as specified.

In testimony whereof we have hereunto set our hands in the presence of two witnesses.

EMIL SALTZKORN.
LUDWIG NICOLAI.

Witnesses:
RUD. SCHMIDT,
HERNANDO DE SOTO.